United States Patent Office 3,639,559
Patented Feb. 1, 1972

3,639,559
METHOD OF ISOLATING ANTIGENS AND/OR ANTIBODIES FROM PROTEIN MIXTURES
Barbara Tax, Goethestrasse 7, Graz, Austria
No Drawing. Filed July 9, 1968, Ser. No. 743,302
Claims priority, application Austria, Aug. 22, 1967,
A 7,706/67
Int. Cl. A61r 27/00
U.S. Cl. 424—12                                    2 Claims

ABSTRACT OF THE DISCLOSURE

Insoluble antigen and antibody derivatives are produced by adding formaldehyde to solutions or sera containing antigen or anti-body protein. These insoluble derivatives are stable specific immuno-adsorbents which are suitable for isolating homologous antibodies or antigens from mixtures with other proteins, and which can be repeatedly used. For eluting antibodies and antigens bound to immuno-adsorbents aqueous propionic acid has proved to be a generally applicable agent.

THE PRIOR ART

It has already been proposed to use antigens in insoluble form for isolating antibodies. Generally the antigen protein is rendered insoluble by coupling it with cellulose derivatives, such as diazotized amino-cellulose, or with synthetic polymers, such as diazotized polyamino-styrene. By the introduction of sulphohydryl groups into the protein followed by cross-linking insoluble antigen derivatives can likewise be obtained. These insoluble antigen protein derivatives, referred to as immuno-adsorbents, can specifically adsorb antibodies and these can then be eluted from the adsorbate at strongly acid pH values. It has already been proposed to use weak acids for eluting. The production of these known immuno-adsorbents is complicated and time-consuming and the separation of the adsorbate at very low pH values leads to partial denaturing of the antibody protein.

Insoluble derivatives of antigens and antibodies can also be obtained by adding ethyl chloroformate to aqueous solutions of antigens or antibodies. Owing to the water insolubility of the ethyl chloroformate the reaction proceeds in a heterogeneous system. It leads to protein polymers which have proved to be very effective specific immuno-adsorbents, and which are more easily accessible than the hitherto used previously mentioned desolubilized proteins or protein derivatives. Before these biologically active water-insoluble protein polymers are used as immuno-adsorbents for isolating antigens and antibodies, the polymer is first thoroughly washed until the optical density of the filtrates at $280\mu$ is 0 and the washing liquids as well as the polymer have a pH of about 7. The polymer that has thus been pretreated is then mixed with the protein solution or the serum containing the antigen or antibody that is to be isolated. An adsorbate is formed by the immuno-adsorbent containing the antibody or antigen and the antigen or antibody that is to be isolated. This adsorbate containing an antigen-antibody complex, which is comparable to that formed by the known antigen-antibody reaction, can then be eluted for the recovery of the adsorbed antigen or antibody with 0.2 m. glycine hydrochloride or 5.5 m. potassium iodide in 0.05 m. tris buffer. This procedure is described in detail in "The Journal of Biological Chemistry," vol. 242, on pages 1651 to 1659 (1967).

Although this method has produced satisfactory results for the isolation of antigens and antibodies from mixtures with other proteins, it has the defect that for developing the immuno-adsorbent, ethyl chloroformate, which is poisonous, suffocating and water-sensitive, is needed, and that the reaction must be performed in a heterogeneous system. Moreover, the elution with glycine hydrochloride or potassium iodide in this method is not yet satisfactory because it is very time-consuming and requires large volumes of eluent so that the protein solutions obtained are undesirably highly diluted.

DESCRIPTION OF THE INVENTION

Unexpectedly it has now been found that solid water-insoluble immuno-adsorbents can be obtained by polymerization in a homogeneous aqueous medium of antigen or antibody protein in solutions or complete sera containing the same if formaldehyde is used as the polymerizing agent. It has also been found that aqueous propionic acid is a generally applicable agent for eluting the antibody or antigen that is to be isolated from an immuno-adsorbent, and that it is an eluent of superior effect to eluents hitherto used.

Accordingly, the present invention provides a method of isolating antigens and/or antibodies from protein mixtures containing the same, comprising the steps of forming a water-insoluble biologically active protein polymer by precipitation with formaldehyde in an aqueous medium, adsorbing the antigens and/or antibodies on said polymer and subjecting the adsorbate to elution.

The invention further comprises a method of isolating antigens and antibodies from protein mixtures by adsorbing the same on water-insoluble biologically active protein polymers, comprising eluting the adsorbate with aqueous propionic acid, preferably with a 0.1 m. aqueous propionic acid. Although it has been known to use weak acids for eluting the adsorbate, propionic acid has never been used for this purpose. Hence, it is unexpected and most surprising that optimum results are obtained by using propionic acid.

In the practical performance of the present method, the same procedure as that described in the above mentioned publication is used for binding the antigen or antibody that is to be isolated to the biologically active protein polymer. The solutions obtained by the elution of the adsorbate, i.e. of the immuno-adsorbent charged with the antigen or antibody, are further processed in a manner that as such is likewise conventional.

It should be observed that the steps proposed by the present invention, namely the use of biologically active protein polymers produced with formaldehyde for isolating antigens or antibodies and the elution of the adsorbate with an aqueous propionic acid need not both be performed. The employment either of the polymers obtained with formaldehyde according to the invention in conjunction with conventional eluents or of the novel eluents for the elution of adsorbates obtained from known immuno-adsorbents already affords considerable advantages over the prior art method, and these will be hereinafter described in greater detail.

It is therefore also within the scope of the present invention to proceed by using a protein polymer that has been obtained by precipitation with formaldehyde to serve as the immuno-adsorbent and eluting the adsorbate with one of the familiar eluents, such as glycine hydrochloride. Conversely, one of the known immuno-adsorbents, such as a protein polymer obtained by precipitation with ethyl chloroformate may be used for adsorption and the adsorbate eluted with an aqueous propionic acid, and both alternatives will be within the scope of the present invention. However, the best results can be achieved by using protein polymers for adsorption, which have been obtained by precipitation with an approximately 30 to 40% formaldehyde in an aqueous medium and by then eluting with about 0.1 m. aqueous propionic acid.

When the previously proposed method described in the above mentioned publication was carried out it was found that the purification of the biologically active protein polymer is very complicated and time-consuming because large volumes of washing liquids, particularly of buffer solutions, are needed and the suspensions formed during washing are not easily filtrable. In contradistinction thereto the biologically active protein polymers obtained as herein proposed by precipitation with formaldehyde require comparatively small volumes of washing liquid for purification and they can be easily separated from the polymer by centrifugation. The expenditure of work and time is therefore far less.

As already mentioned large volumes of eluents are needed for performing the prior art method of elution with glycine hydrochloride or potassium iodide. The final solutions of the antigen or antibody that is to be isolated are therefore undesirably highly diluted, a circumstance which creates difficulties during the further procedures, because of the large volumes that must be handled. Denaturing is also unavoidable. Surprisingly the complete elution from the adsorbate of the antigen or antibody that is to be isolated requires only small volumes of eluent when an aqueous propionic acid and preferably 0.1 m. aqueous propionic acid is used. The awkward handling of large volumes during the process of working up is avoided and, owing to the higher concentration of the solutions obtained, denaturing is less likely.

Another major advantage of the present method is that the solutions from which the biologically active protein polymer is precipitated with formaldehyde may contain a considerably lower protein concentration than the solutions in which the polymer is produced with ethyl chloroformate. Where as in the event of the protein polymer in the prior art method being produced from a complete serum, the latter is first freeze-dried and must then be re-dissolved in a small volume of a suitable buffer solution, the precipitation with formaldehyde according to the present invention can be directly applied to a complete serum which has merely been concentrated to about half its original volume by ultra-filtration which, as known, takes little time to perform. This is of special importance when dealing with sera containing antigens or antibodies which are too sensitive to be submitted to freeze-drying.

The invention will now be illustrated by the following non-limiting examples:

EXAMPLE 1

1 ml. of a 35% aqueous solution of formaldehyde is introduced dropwise with stirring to 1 ml. of a 20% solution of human serum albumin in a 0.9% solution of common salt, whereby the pH is reduced to 4.2. During the introduction of the formaldehyde soltuion, the pH is maintained in the range from 4.0 to 4.5 by adding 0.1 N HCl or 0.1 N NaOH if necessary. This produces turbidity and, after the addition of the formaldehyde solution has been completed, a gelatinous mass forms and finally, with gentle stirring, lumps of a protein polymer appear.

The polymer thus obtained is allowed to stand for about 1 hour at room temperature and then is disintegrated. For disintegration any stirrer may be used which has an effect corresponding to start of a conventional mechanical high frequency device for dispersing, homogenizing, dissolving or emulsifying. Such a mechanical high frequency device is for instance that known as an "Ultraturax" (Rompp, Chemielexikon, 1958, column 4586). Naturally other devices of similar kind, such as a homogenizer according to Prof. P. Willems, may also be used for disintegration.

The following solutions are used for washing the disintegrated protein polymer:

(1) A solution which is 2 m. with respect to NaCl, 0.02 m. with respect to $NH_4Cl$, and the pH of which is adjusted to 9 with $NH_4OH$.

(2) A solution which is a mixture of a 0.2 m. potassium phosphate buffer and a 0.9% solution of NaCl, pH 7.

(3) A 0.9% solution of NaCl.

The polymer is washed three times with any one of the above solutions. Washing is effected in centrifuge glasses of a capacity of 50 ml. and the used washing liquid is simply decanted at the end of centrifugation which is effected at 5000 r.p.m. The washing and centrifuging are continued until the supernatant solution exhibits no protein extinction, i.e. until its extinction at 280μ is zero.

In an Erlenmeyer flask, 150 ml. of horse antiserum against human serum albumin are added to the purified protein polymer, 1 ml. of this antiserum corresponding to 0.13 ml. of a 0.1% albumin solution. The mixture is stirred for about 2 hours at room temperature and for 12 hours at 4° C. with a magnetic stirrer, whereafter the supernatant solution is free from precipitable antibody protein.

The protein complex thus formed is separated from the supernatant residual serum by centrifuging (5000 r.p.m.). The precipitate is washed three times with 0.9% solution of common salt, again in centrifuge glasses of about 50 ml. capacity, the supernatant solution being decanted each time after centrifuging. In the majority of cases, the extinction of the supernatant solution at 280μ is zero after three washes.

The precipitate that has thus been washed is then mixed with 0.1 m. propionic acid until the pH has been reduced to 4 and, after having been stirred for 20 minutes at room temperature, it is centrifuged off. The precipitate is then again taken up twice more in a like volume of 0.1 m. propionic acid, 12.5 ml. of 0.1 m. propionic acid being used altogether. The protein content of the recombined propionic acid solutions is measured by reference to its extinction at 280μ. The solution is then dialyzed at 4° C. with a 0.9% solution of common salt to remove the propionic acid from the antibody solution.

The resultant solution contains 62 mg. of antibodies. A precipitin test of the product is positive (precipitin or ring test according to Kabat and Mayer, Experimental Immunochemistry, Ch.C. Thomas, Springfield, 111, 1961). Immunoelectrophoresis gives the clear precipitation line of the albumin.

After desorption of the antibody from the antigen protein polymer, the polymer is again washed with 0.1 m. propionic acid, twice with the above-described potassium phosphate buffer and twice with a 0.9% solution of common salt, and it can then be used again for adsorbing antibodies from the horse antiserum against human serum albumin.

EXAMPLE 2

1.5 ml. of a 35% aqueous solution of formaldehyde is added to a solution of 300 mg. of human serum albumin and 25 mg. of lactate dehydrogenase (pigs muscle) in 5 ml. of a 0.9% solution of common salt in the manner described in Example 1, and the pH falls to 4.5.

The copolymer obtained is disintegrated and washed as described in Example 1.

The purified copolymer is mixed, as described in Example 1, with 12.5 ml. of rabbit antiserum against pigs muscle lactate dehydrogenase. Purification and elution of the resultant protein complex and the processing of the eluates is again performed in the manner described in Example 1, 5.5 ml. of 0.1 m. propionic acid being used for elution.

The antibody solution finally obtained contains 1.8 mg. of antibodies. The product gives a positive precipitin test and a serological test according to Ouchterlony is also positive (For Ouchterlony test, cf. Int. Arch. Allergy, vol. 5, 1954, pp. 337 to 366).

EXAMPLE 3

10 ml. of a complete human β-lipoproteid serum are first concentrated to 3 ml. by ultrafiltration, and 3 ml. of a 35% aqueous solution of formaldehyde are added to precipitate a polymer in the manner described in Example 1. After the addition of all the formaldehyde solution, the pH is about 4.2.

The purified protein polymer is mixed with 10 ml. of horse antiserum against human β-lipoproteid (1.8 mg. of antibodies per milliliter).

The washed protein complex is eluted with 15 ml. of 0.1 m. propionic acid in the manner described in Example 1.

The solution finally obtained contains 9 mg. of antibodies. The product gives a positive precipitin test, and a clear precipitation line of the β-lipoproteid is obtained on immunoelectrophoresis.

EXAMPLE 4

The general procedure is again as described in Example 1.

10 ml. of a complete pigs' β-lipoproteid serum are concentrated to 3 ml. by ultrafiltration, and 3 ml. of a 35% tion. When all the formaldehyde solution has been added, the pH is at 4.2.

The purified protein polymer is mixed with 10 ml. of horse antiserum against pigs' β-lipoproteid (1.2 mg. of antibodies per milliliter).

The washed protein complex is eluted with 15 ml. of 0.1 m. propionic acid.

The solution finally obtained contains 7 mg. of antibodies. The product gives a positive precipitin test and the precipitation line of the β-lipoproteid on immunoelectrophoresis is clearly developed.

EXAMPLE 5

The general procedure is again as described in Example 1.

1.3 ml. of an about 16% solution of human gamma-globulin (200 mg.) are used, and precipitation is performed with 1 ml. of a 35% aqueous solution of formaldehyde. When all the formaldehyde solution has been added the pH is about 5.2.

The purified protein polymer is mixed with 12 ml. of rabbit antiserum against human gamma-globulin.

9 ml. of 0.1 m. propionic acid are expended in eluting the washed protein complex.

The solution finally obtained contains 11 mg. of antibodies. The product give a positive precipitin test on immunoelectrophoresis the precipitation line of the gamma-globulin is clearly developed.

EXAMPLE 6

The general procedure is as described in Example 1.

10 ml. of a 2% solution of gamma-globulin isolated from antibody serum are mixed with 1 ml. of a 16% solution of gamma-globulin. For precipitation, 6 ml. of a 35% aqueous solution of formaldehyde are used. After all the formaldehyde solution has been added the pH is about 5.1.

The purified protein copolymer is mixed with 5 ml. of a complete human serum (albumin).

The washed protein complex is eluted with 8 ml. of 0.1 m. propionic acid.

The solution finally obtained contains 16 mg. of antigen (albumin). The product gives a positive precipitin test and the band corresponding to the pure substance appears in paper electrophoresis.

EXAMPLE 7

The general procedure is as described in Example 1.

10 ml. of a complete horse antiserum against human β-lipoproteid are concentrated to 4 ml. by ultrafiltration, whereupon precipitation is performed with 3 ml. of a 35% aqueous solution of formaldehyde. When all the formaldehyde solution has been added the pH is at 4.2.

The purified protein copolymer is mixed with 10 ml. of human serum (β-lipoproteid).

6 ml. of 0.1 m. propionic acid are expended in eluting the washed protein complex.

The solution finally obtained contains 12 mg. antigen (human β-lipoproteid). The product gives a positive precipitin test and the corresponding band of the pure substance (stained with Sudan black) appears in paper electrophoresis.

EXAMPLE 8

The general procedure is as described in Example 1.

5 ml. of a complete antiserum against pig' β-lipoproteid are saturated with $(NH_4)_2SO_4$ and taken up in 1 ml. of water. For precipitation 1 ml. of a 35% aqueous formaldehyde solution are used. When all the formaldehyde solution has been added the pH is about 4.

The purified globulin polymer is mixed with 5 ml. of of pigs' serum (β-lipoproteid).

6 ml. of 0.1 m. propionic acid are used for eluting the washed protein complex.

The solution finally obtained contains 8 mg. of antigen (β-lipoproteid). The product gives a positive precipitin test and the band corresponding to the pure substance (stained with Sudan black) appears in paper electrophoresis.

I claim:

1. In a method of isolating at least one member of the group consisting of antigens and antibodies from blood of warm-blooded animals from protein mixtures containing the same comprising the steps of absorbing the antigens and antibodies on an immuno-adsorbent and subjecting the adsorbate to elution, the improvement which comprises using as the eluting agent, aqueous propionic acid.

2. The method of claim 1, wherein the aqueous propionic acid is approximately 0.1 m.

References Cited

UNITED STATES PATENTS 3,096,250  7/1963  Ingraham _____ 424—12
3,426,123  2/1969  Hoff _____ 424—12

RICHARD L. HUFF, Primary Examiner

U.S. Cl. X.R.

424—85, 88